United States Patent

Breunig et al.

[11] Patent Number: 5,921,613
[45] Date of Patent: Jul. 13, 1999

[54] ARRANGEMENT FOR GUIDING A SWING-OUT SLIDING DOOR ON A VEHICLE BODY

[75] Inventors: Steffen Breunig, Elztal; Oliver Hasenoehrl, Hildrizhausen; Berthold Klein, Rutesheim, all of Germany

[73] Assignee: Daimler-Benz Aktiengesellschaft, Stuttgart, Germany

[21] Appl. No.: 08/917,513

[22] Filed: Aug. 26, 1997

[30] Foreign Application Priority Data

Aug. 26, 1996 [DE] Germany ............... 196 34 369

[51] Int. Cl.$^6$ ............................................. B60J 5/06
[52] U.S. Cl. .................. 296/155; 296/146.12; 49/212; 49/211; 49/254
[58] Field of Search ............ 296/146.11, 146.12, 296/155; 49/212, 254, 255, 211, 129, 130, 156

[56] References Cited

U.S. PATENT DOCUMENTS

| 3,051,999 | 9/1962 | Schimek | 49/212 |
|---|---|---|---|
| 3,075,803 | 1/1963 | Wilfert | 49/212 |
| 3,935,674 | 2/1976 | Williams et al. | 49/212 |
| 4,268,996 | 5/1981 | Allen | 49/212 |
| 4,495,729 | 1/1985 | Britzke et al. | 49/212 |
| 4,617,756 | 10/1986 | Dilcher | 49/212 |

FOREIGN PATENT DOCUMENTS

| 1 218 290 | 12/1963 | Germany . | |
|---|---|---|---|
| 1 480 6120 | 6/1965 | Germany . | |
| 61-278419 | 12/1986 | Japan | 296/155 |
| 63-312230 | 12/1988 | Japan | 296/155 |

*Primary Examiner*—D. Glenn Dayoan
*Assistant Examiner*—Jason Morrow
*Attorney, Agent, or Firm*—Evenson, McKeown, Edwards & Lenahan, P.L.L.C.

[57] ABSTRACT

An arrangement guides a swing-out sliding door of a vehicle body without a center guide rail which is visibly disposed on the outside on the vehicle body side wall. One linearly constructed guide rail respectively is fixed within the door opening on its upper and lower edge on the vehicle body side. A roller carriage to which the sliding door is linked by way of a control arm parallelogram travels in each guide rail. One closing roller respectively guided in each guide rail travels at the end of the door closing sliding movement into a circular closing groove branching off the guide rail in the direction of the sliding door. The closing roller is fixed to one of the control arms of the control arm parallelogram. The closing groove is constructed such that its curvature center in the door closing position of the roller carriage coincides with the roller-carriage-side hinge axis of the control arm carrying the closing rollers.

20 Claims, 3 Drawing Sheets

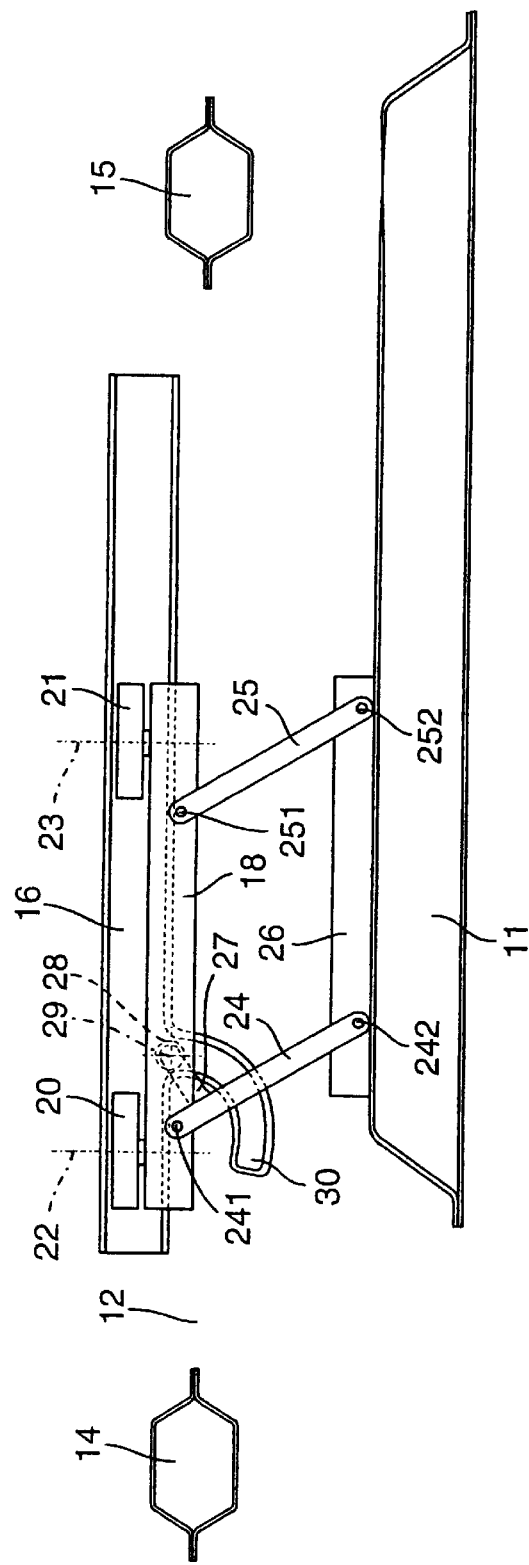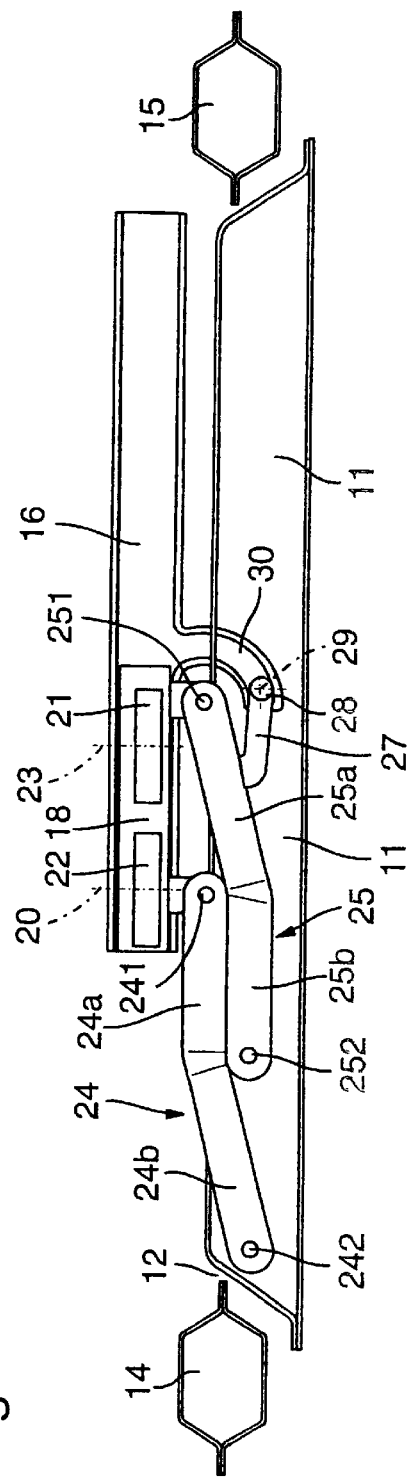

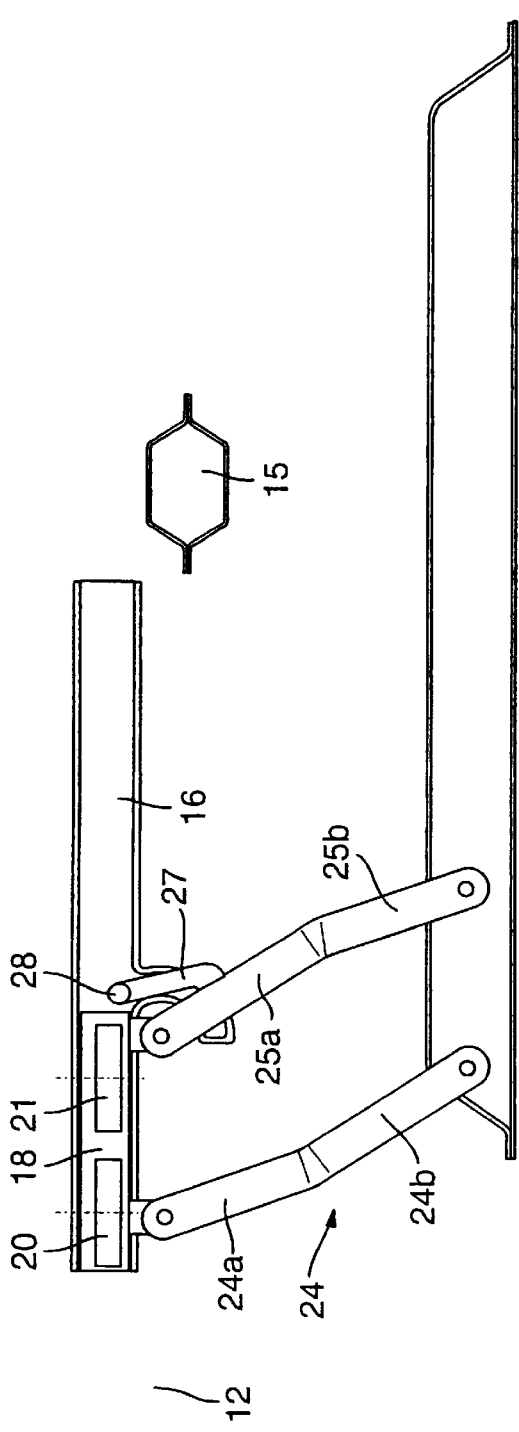
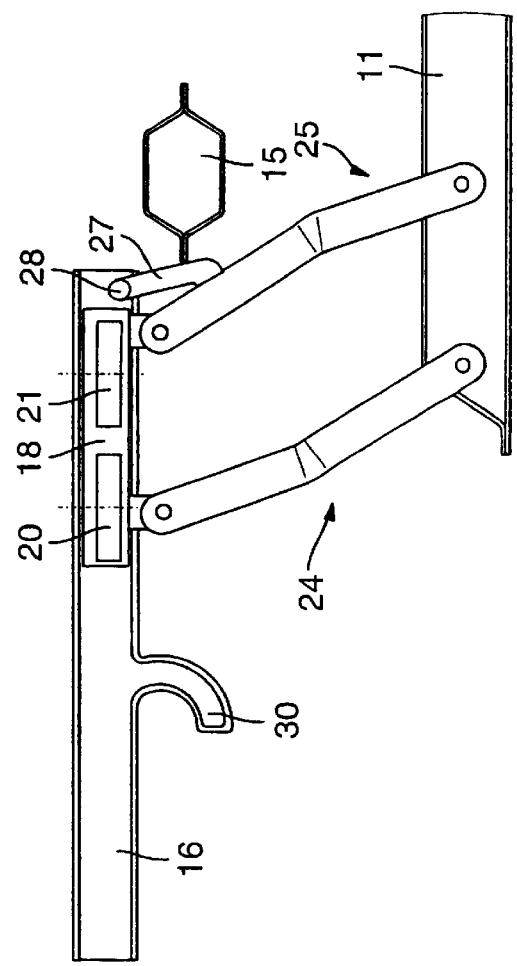

ARRANGEMENT FOR GUIDING A SWING-OUT SLIDING DOOR ON A VEHICLE BODY

BACKGROUND AND SUMMARY OF THE INVENTION

The present invention relates to an arrangement for guiding a swing-out sliding door on a vehicle body, particularly of a motor vehicle. That is, the present invention is directed to an arrangement which, in its closing position covering a door opening, rests largely flush in the vehicle body and, in its open position completely exposing the door opening, is disposed at a parallel distance in front of the vehicle body, having a supporting member which is connected with the sliding door in an articulated member, having a roller carriage which holds the supporting member and which has rollers travelling in a guide rail fixed on the vehicle body side, and having a closing roller which is guided in the guide rail and which, at the end of the door closing sliding movement, travels into a closing groove branching off the guide rail.

In DE-AS 1 480 612, the guide rail is arranged on the outside on the vehicle body wall approximately in the center with respect to the sliding door and extends to the door opening. The supporting member is constructed as a supporting arm which is rigidly connected with the roller carriage and which, at the end of the sliding door which is in the rear in the door closing sliding direction, is fixed on the sliding door with a vertically aligned hinge axis. Another guide rail is fastened inside the door opening on the upper vehicle body edge, and another roller travels on the additional guide rail and is held on the sliding door with a horizontally aligned axis.

The known additional guide rail extends in a curved manner into the inside on the end of the door opening facing away from the center guide rail so that, at the end of the door closing sliding movement, also the end of the sliding door facing away from the supporting arm is forcibly guided in the direction of the vehicle body and thus, in the door closing position, the sliding door rests on both ends flush in the vehicle body.

One of the rollers of the roller carriage with a horizontally aligned roller axis is used for the support in the downward direction and one roller with a vertically aligned roller axis is used for guiding the door transversely to the sliding direction. The closing roller is spaced from the roller with the vertically arranged roller axis on the roller carriage and also has a vertically aligned roller axis. The closing roller is located on the end of the roller carriage which is in the front in the door closing sliding direction. At the end of the door closing sliding movement, this closing roller travels into the closing groove which continues in a seamless manner at the forward end of the center guide rail and is curved into the interior of the vehicle body.

In a known sliding door for aircraft shown in DE-AS 1 218 290, the guiding device comprises two upper and low lower guide rails which are fastened parallel to one another in the side wall of the aircraft body. The rails are provided on end side, on one hand, with a closing cam which extends in a curved manner into the vehicle body interior and, on the other hand, with a stop. The supporting members which are supported by one roller respectively having a vertical roller axis on the two upper and lower guide rails in each case have three mutually rigidly connected arms. One arm is connected by way of a torsion spring bar with the sliding door; the two other arms each carry one of the two guide rollers respectively on their free end.

It is an object of the present invention to provide an arrangement for guiding a swing-out sliding door on a vehicle body, particularly for motor vehicles, in which a visible guide rail situated on the outside on the vehicle body side wall is avoided.

The foregoing object has been achieved in accordance with the present invention by providing that each guide rail with the closing groove is arranged within the door opening at its upper and lower edge, in that a roller carriage travels in each guide rail, in that the supporting members between the sliding door and the roller carriage are constructed as control arm parallelograms whose respective two control arms having vertically extending hinge axes are linked close to the upper and lower end of the sliding door and to the roller carriage, in that the closing rollers are fixed on one control arm of the control arm parallelograms respectively, in that the guide rails are constructed in a straight line, and in that the closing grooves are each constructed as a circular groove branching off from the guide rail toward the sliding door, the curvature center of the groove in the door closing end position of the roller carriage coinciding with the roller-carriage-side hinge axis of the control arm carrying the closing roller.

The arrangement according to the present invention has the advantage that, because of the absence of the exterior guide rail, a smooth-surface shell of the vehicle body can be maintained so that fewer wind noises will occur and the vehicle body design is not subjected to requirements determined by the sliding door. Simultaneously, the bothersome dirtying of the open guide rail and a certain sluggishness of the sliding movement with an accompanying extreme generating of noise is eliminated because the rollers in the exterior guide rail must not be lubricated in order to avoid the danger of a soiling of the driver. Also, the danger of corrosion of the exterior guide rail, which had always existed, is eliminated.

Because of the construction of the supporting members between the sliding door and the roller carriage as control arm parallelograms, the door opening in accordance with the present invention can be made significantly larger and the guide rails can be kept significantly shorter so that the space required for them is reduced. The guide rails, which are now situated inside the door opening in the interior, are less endangered by corrosion and can be conveniently serviced and optionally greased.

BRIEF DESCRIPTION OF THE DRAWINGS

Other objects, advantages and novel features of the present invention will become apparent from the following detailed description of the invention when considered in conjunction with the accompanying drawings wherein:

FIG. 2 is a top view of an arrangement for guiding the sliding door on the vehicle body of the passenger car in FIG. 1;

FIGS. 4 to 6 are views similar to FIG. 2 but of a modified arrangement for guiding the sliding door in three different positions, specifically when the sliding door is closed, when the sliding door is swung open and when the sliding door is completely open, respectively.

DETAILED DESCRIPTION OF THE DRAWINGS

Figure 1:
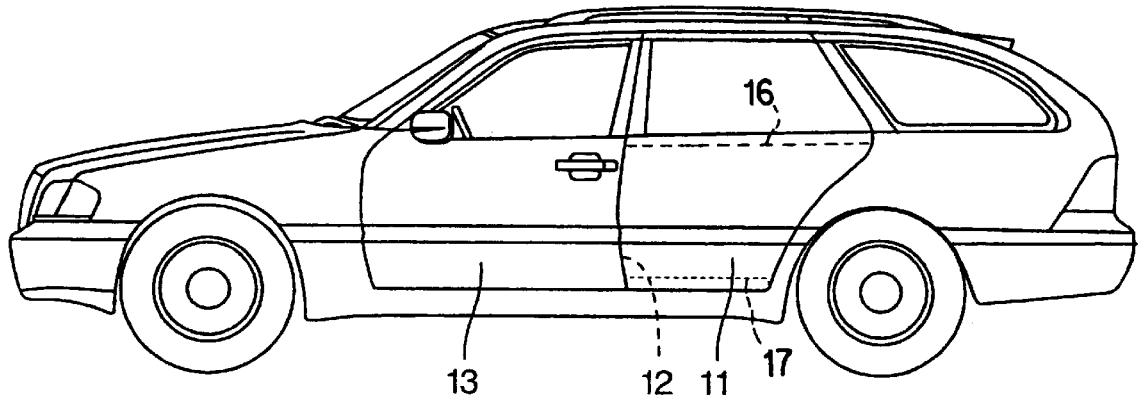
FIG. 1 is a side view of a passenger car having a swing-out sliding door in the closed condition.

The passenger car in FIG. 1 has a rear side door which is conceived as a swing-out sliding door 11. In its illustrated closed position, in which it covers a door opening 12 in the side wall of the vehicle body, which reaches from the vehicle roof to the vehicle floor, the sliding door 11 is disposed in a flush manner in the side wall of the vehicle body 13. In its open position, in which it exposes the door opening 12 completely, it projects at a distance in front of the side wall of the vehicle body 13 and, in the illustrated passenger car in FIG. 1, partially covers its rear wheel.

Figure 3:
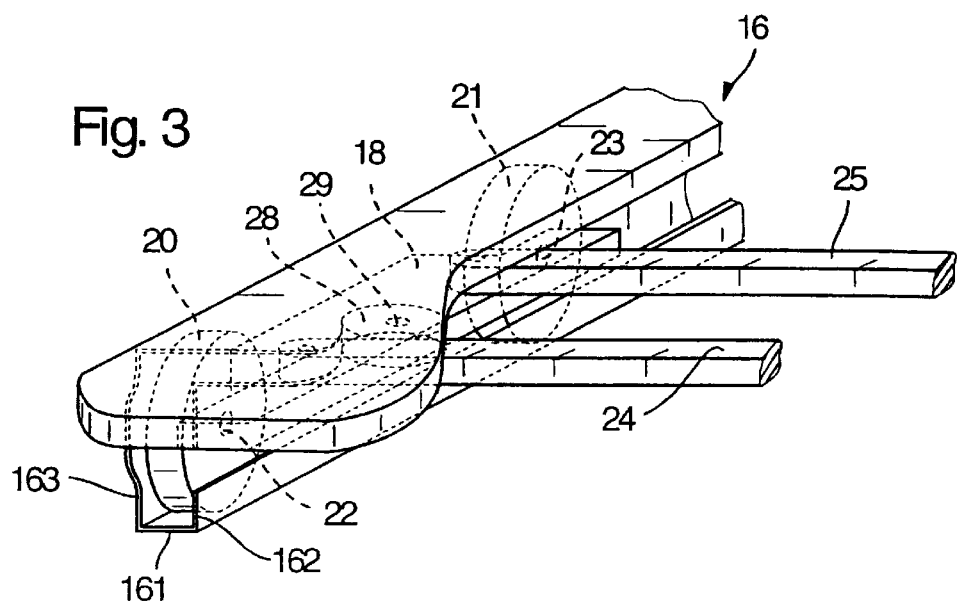
FIG. 3 is a perspective view of a cutout of the arrangement in FIG. 2.

The arrangement for guiding the sliding door 11 on the vehicle body 13 is shown as a top view in FIG. 2 and is shown as a perspective cutout in FIG. 3. FIG. 2 shows the B-column 14 and the C-column 15 of the vehicle body 13 which bound the door opening 12 in the front and in the rear in the vehicle longitudinal direction. The arrangement comprises two linearly constructed guide rails 16, 17, both of which being arranged in the area of the door opening 12. One guide rail 16 is fastened on top on the roof frame of the vehicle body 13, and the other guide rail 17 is embedded flush on the bottom in the vehicle floor of the vehicle body 13. The two guide rails 16, 17 are indicated schematically in FIG. 1. FIGS. 2 and 3 each show only the top guide rail 16. The two guide rails 16, 17 have an identical construction so that reference is made only to guide rail 16.

A roller carriage 18 (FIGS. 2 and 3) is longitudinally slidably guided in each guide rail 16, 17 and, for this purpose, has two rollers 20, 21 with horizontally aligned roller axes 22, 23. The rollers 20, 21 roll along a lower guiding surface 161 of the guide rail 16. A control arm parallelogram consisting of two control arms 24, 25 connects each roller carriage 18 in an articulated manner with the interior side of the sliding door 11; specifically, the upper roller carriage 18 in the upper guide rails 16 close to the upper edge of the sliding door 11, and the lower roller carriage 18 in the lower guide rail 17 close to the lower edge of the sliding door 11. The four end-side hinge axes of the control arms 24, 25 have the reference numbers 241, 242 and 251, 252 (FIG. 2). In this case, the sliding-door-side hinge axes 242, 252 of the two control arms 24, 25 are arranged on a supporting console 26 which, in turn, is fixedly screwed to the sliding door 11.

An extension arm 27 projects away from the control arm 24 of the two control arm parallelograms which is in the front in the door closing sliding direction. A closing roller 28 is rotatably disposed on the free end of the extension arm 27. The roller axis 29 of the closing roller 28 also guided in the guide rail 16 and 17 is vertically aligned; therefore it points in the same direction as the hinge axes 241–252 of the roller arm parallelogram, and is guided on the two lateral guiding surfaces 162, 163 (FIG. 3) of the guide rail 16.

In the lateral guiding surface 162 pointing to the sliding door 11, a circular closing groove 30 branches off the guide rail 16, 17, specifically precisely at the point at which the closing roller 28 comes to be situated when the roller carriage 18 takes up its end position in the door closing position, and thus is displaced in the guide rail 16, 17 as far as possible in the door closing direction. This position of the roller carriage 18 is illustrated in FIG. 2. In this position of the roller carriage 18, the curvature center of the closing groove 30 coincides with the roller-carriage-side hinge axis 241 of the control arm 24 carrying the extension arm 27 with the closing roller 28.

In the modified arrangement illustrated in FIGS. 4 to 6, the control arms 24, 25 of the two control arm parallelograms are bent approximately in the center at an obtuse angle so that the two bent parts 24a, 24b and 25a, 25b enclose an obtuse angle with one another. The bending in the control arms 24, 25 is carried out in opposite directions so that the two obtuse angles of the control arms 24, 25 in the control arm parallelogram face one another. In this case, the bending of the two control arms 24, 25 is carried out such that, in the door closing position, the bent part 25b, which is linked to the sliding door side, of the control arm 25 which is in the rear in the door closing sliding direction rests flatly against the bent part 24a of the forward control arm 24 which is linked to the roller carriage side (FIG. 4).

The different positions of the sliding door in FIGS. 4 to 6 will explain the method of operation of the described arrangement for guiding the swing-out sliding door 11 on the vehicle body 13 as now discussed. In the closed condition of the sliding door 11, the roller carriage 18 is in its door closing end position as seen in FIG. 4. The control arm sections 24a, 25b of the two control arm parallelograms are in each case disposed flatly on one another, and the sliding door 11 is situated flush in the vehicle body 13 so as to close the door opening 12. During the opening operation, the roller carriage 18 first remains in this end position and only the sliding door 11 swings out by way of the two control arm parallelograms on the upper and lower edge of the sliding door 11. Thereby, a swinging motion is forced by the closing rollers 28 travelling in the two closing grooves 30, until the two closing rollers 28 emerge from the closing grooves 30 and enter the respective upper and lower guide rails 16, 17. This condition is illustrated in FIG. 5. Until then, the roller carriage 18 is non-slidably held in each guide rail 16, 17, and the sliding door 11 swings out only in parallel to the vehicle. As soon as the closing rollers 28 have entered into the straight guide rails 16, 17, a travelling movement of the roller carriages of the two guide rails 16, 17 is possible. During the travelling movement of the roller carriages 18, the closing rollers 28 remain in the guide rails 16, 17, so that a swinging of the sliding door 11 into the control arm parallelograms is not possible. The sliding door 11 can now be pushed back until the two roller carriages 18 have reached their end position at the other end of the guide rails 16, 17. This position of the roller carriage 18 when the sliding door 11 is fully open is illustrated in FIG. 6.

For closing the sliding door 11 by sliding thereof first the roller carriage 18 is moved in each guide rail 16, 17 into its frontmost door closing end position, as illustrated in FIG. 5. Then each control arm parallelogram swings in again while the closing rollers 28 enter into the closing grooves, and the sliding door 11 is closed again as seen in FIG. 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for guiding a swing-out sliding door on a vehicle body which door, in a closed position thereof covering a door opening rests largely flush in the vehicle body and, in an open position thereof completely exposing the door opening, is disposed parallel to the vehicle body, comprising supporting members connected with the sliding door in an articulated manner, a roller carriage configured to hold the supporting member and having rollers travelling in guide rails fixed on a side of the vehicle body, and closing rollers guided in the guide rails and which, at the end of door closing sliding movement, travels into a closing groove branching off the guide rails, wherein each guide rail with the closing groove is arranged within the door opening at an upper and lower edge thereof, the roller carriage travels in each of the guide rails, the supporting members between the sliding door and the roller carriage are configured as control arm parallelograms with respective control arms having vertically extending hinge axes and linked proximate an upper and lower end of the sliding door and to the roller carriage, the closing rollers are fixed on one of the control arms of the control arm parallelograms respectively, the guide rails have a rectilinear configuration, and the closing grooves are configured as a circular groove branching off from the guide rails toward the sliding door, the curvature center of the groove in the door closing end position of the roller carriage coinciding with a roller-carriage-side hinge axis of the control arms carrying the closing rollers.

2. The arrangement according to claim 1, wherein the closing roller is fastened on the control arm which is located forwardly in a door closing sliding direction.

3. The arrangement according to claim 1, wherein the closing roller is arranged on an end of an extension arm projecting from the control arm.

4. The arrangement according to claim 3, wherein the closing roller is fastened on the control arm which is located forwardly in a door closing sliding direction.

5. The arrangement according to claim 1, wherein the rollers are operatively disposed on the roller carriage with horizontally aligned roller axes.

6. The arrangement according to claim 5, wherein the closing roller is fastened on the control arm which is located forwardly in a door closing sliding direction.

7. The arrangement according to claim 6, wherein the closing roller is arranged on an end of an extension arm projecting from the control arm.

8. The arrangement according to claim 1, wherein one of the guide rails is an upper guide rail arranged in a roof area of the vehicle body and another of the guide rails is a lower guide rail disposed flush in a floor of the vehicle body.

9. The arrangement according to claim 8, wherein the closing roller is fastened on the control arm which is located forwardly in a door closing sliding direction.

10. The arrangement according to claim 9, wherein the closing roller is arranged on an end of an extension arm projecting from the control arm.

11. The arrangement according to claim 10, wherein the rollers are operatively disposed on the roller carriage with horizontally aligned roller axes.

12. The arrangement according to claim 1, wherein the control arms of each control arm parallelogram are bent approximately in a central region thereof at an obtuse angle to have opposed facing portions in the control parallelogram.

13. The arrangement according to claim 12, wherein the bent control arms in each control arm parallelogram are configured such that, in the closing position of the sliding door, a bent part linked to a sliding door side, of one of the control arms located rearwardly in a door closing sliding direction rests flatly against a bent part of another of the control arms located forwardly and linked to the roller carriage side.

14. The arrangement according to claim 12, wherein the closing roller is fastened on the control arm which is located forwardly in a door closing sliding direction.

15. The arrangement according to claim 14, wherein the closing roller is arranged on an end of an extension arm projecting from the control arm.

16. The arrangement according to claim 15, wherein the rollers are operatively disposed on the roller carriage with horizontally aligned roller axes.

17. The arrangement according to claim 16, wherein one of the guide rails is an upper guide rail arranged in a roof area of the vehicle body and another of the guide rail is a lower guide rail disposed flush in a floor of the vehicle body.

18. The arrangement according to claim 14, wherein the bent control arms in each control arm parallelogram are configured such that, in the closing position of the sliding door, a bent part linked to a sliding door side, of one of the control arms located rearwardly in a door closing sliding direction rests flatly against a bent part of another of the control arms located forwardly and linked to the roller carriage side.

19. The arrangement according to claim 18, wherein the closing roller is fastened on the control arm which is located forwardly in a door closing sliding direction.

20. The arrangement according to claim 19, wherein the closing roller is arranged on an end of an extension arm projecting from the control arm.

* * * * *